United States Patent [19]

Lau et al.

[11] Patent Number: 4,695,772
[45] Date of Patent: Sep. 22, 1987

[54] DIGITAL MULTI-BEAM CRT CONTROLLER

[75] Inventors: Robert S. Lau, San Jose; Roy E. Murphy, Watsonville; Robert G. Quick, Jr., Ben Lomond, all of Calif.

[73] Assignee: Azuray Inc., Scotts Valley, Calif.

[21] Appl. No.: 752,266

[22] Filed: Jul. 3, 1985

[51] Int. Cl.$^4$ ............................................. H01J 29/56
[52] U.S. Cl. .................................................... 315/370
[58] Field of Search ................. 315/370, 371, 382, 365

[56] References Cited

U.S. PATENT DOCUMENTS

| | | | |
|---|---|---|---|
| 3,852,640 | 12/1974 | McCarthy | 315/371 |
| 3,959,689 | 5/1976 | Ikoma | 315/370 |
| 4,410,841 | 10/1983 | Dusard et al. | 315/382 |
| 4,520,356 | 5/1985 | O'Keefe et al. | 340/750 |

Primary Examiner—Theodore M. Blum
Attorney, Agent, or Firm—Flehr, Hohbach, Test, Albritton & Herbert

[57] ABSTRACT

There is described a picture quality control system for use with a multi-beam cathode ray tube raster scan display device. The display device generates an image comprising a multiplicity of parallel, nonoverlaping bands of pixels, each band of pixels comprising a set of parallel lines of pixels.

The control system includes a linearity correction circuit and a dynamic detwist correction circuit. The linearity correction circuit adjusts the distance between neighboring bands of pixels. The dynamic detwist correction circuit adjusts the relative positions of the electron beams generated by the cathode ray tube.

The control system further includes a dynamic astigmatism correction circuit and a dynamic focus correction circuit for correcting astigmatism and focus imperfections in the image generated by said cathode ray tube. A dynamic size correction circuit adjusts the size of the pixels generated by the electron beams.

The display is organized as an array of tiles. Each dynamic correction circuit in the control system includes a digital memory for storing a corresponding correction value for each said tile. Each correction value specifies the magnitude of the electromagnetic field to be generated by the corresponding coil or field generator when the cathode ray tube's electron beams are being deflected into the corresponding tile.

17 Claims, 11 Drawing Figures

DIGITAL MULTI-BEAM CRT CONTROLLER

The present invention relates generally to a cathode ray tube (CRT) control system, and particularly to a high resolution multi-beam CRT system having correction circuitry to correct for aberrations due to gun and yoke misalignment and imperfections, and also to correct for aberrations peculiar to multi-beam CRTs.

BACKGROUND OF THE INVENTION

Prior art CRT controllers have generally used analog circuitry to generate both the control signals and the correction coil signals used to control a cathode ray tube (CRT). For example, virtually every CRT made includes a standard analog "pin cushion" circuit for modulating the CRT's vertical drive (or, sometimes, the horizontal drive) signal to compensate for the fact that different points on the CRT screen are of a different distance from the CRT's focal point.

Further, many prior art CRT's include static focus and astigmatism correction coils. These coils have an adjustable voltage or current, which is typically adjusted at manufacturing time to compensate for gun and yoke misalignment and imperfections. However, these prior art correction coils are generally used to generate a static field that does not vary with the CRT's raster screen position.

The aforementioned prior art is generally sufficient in low resolution applications to correct for gun and yoke misalignment and other gun imperfections. In such circumstances, small differences in the distances between raster lines and small astigmatisms and defocus are either not noticeable to the human eye or do not significantly affect picture quality.

In high resolution applications (typically having a resolution of at least 1000 by 1000 pixels), small imperfections in the picture generated by a CRT become more noticeable and the need for accurate picture generation makes the above mentioned imperfections more significant.

With the use of a high resolution multi-beam CRT, the inventors have found that (1) small differences in the distances between raster lines become more noticeable; and (2) "twisting" of the beams, especially at the outside corners of the display, creates noticeable imperfections in the picture generated. "Twisting" in this context means that pixels generated by parallel beams which should be vertically aligned are horizontally displaced from one another because the band of beams in the CRT is twisted by electromagnetic forces from its normal vertical orientation.

The inventors have found that the combination of using a multi-beam CRT and several different improvements over the prior art CRT systems generates the best high resolution pictures. The first improvement is the use of a vertical linearity correction circuit which adjusts the distance between each band of raster lines. A second improvement is the use of dynamic size, focus and astigmatism correction circuits which provide the ability to use different size, focus and astigmatism corrections for every "tile" on the display. A third improvement is the provision of a "detwister" correction coil and a corresponding correction circuit to compensate for twisting of the CRT beams.

All of the above mentioned improvements are implemented using digital circuitry, which allows the dynamic generation of very precise correction signals that vary as a function of screen position. Further, the use of digital correction circuitry facilitates and greatly simplifies the calibration of each separate correction signal.

It is therefore a primary object of the present invention to provide a multi-beam CRT system which dynamically corrects for the imperfections in the picture generated.

Another object of the present invention is to provide a multi-beam CRT system which corrects for twisting of the CRT beams.

Yet another object of the present invention is to provide digital correction signal generation circuitry which allows the dynamic generation of correction signals which that vary as a function of screen position.

SUMMARY OF THE INVENTION

In summary, the present invention is a picture quality control system for use with a multi-beam cathode ray tube raster scan display device. The display device generates an image comprising a multiplicity of parallel, nonoverlaping bands of pixels, each band of pixels comprising a set of parallel lines of pixels.

The control system includes a linearity correction circuit and a dynamic detwist correction circuit. The linearity correction circuit adjusts the distance between neighboring bands of pixels. The dynamic detwist correction circuit adjusts the relative positions of the electron beams generated by the cathode ray tube.

The control system further includes a dynamic astigmatism correction circuit and a dynamic focus correction circuit for correcting astigmatism and focus imperfections in the image generated by said cathode ray tube. A dynamic size correction circuit adjusts the size of the array (and thus the pixels) generated by the electron beams.

The display is organized as an array of tiles. Each dynamic correction circuit in the control system includes a digital memory for storing a corresponding correction value for each said tile. Each correction value specifies the magnitude of the electromagnetic field to be generated by the corresponding coil or field generator when the cathode ray tube's electron beams are being deflected into the corresponding tile.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
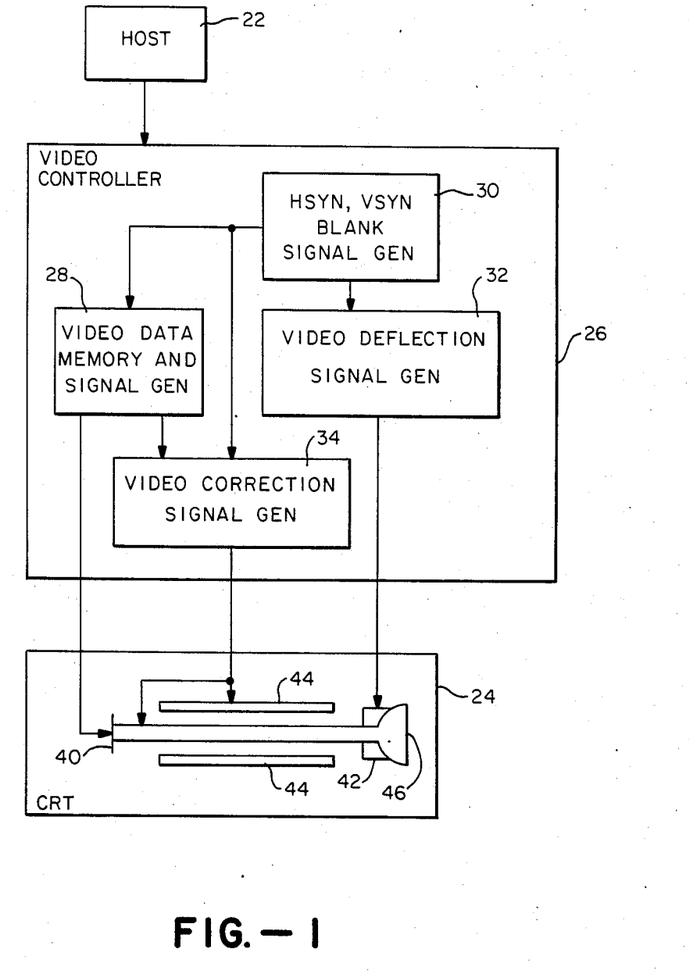
FIG. 1 is a block diagram of a multi-beam cathode ray tube (CRT) system in accordance with the present invention.

Referring to FIG. 1, there is shown a block diagram of a multi-beam cathode ray tube (CRT) 20 system in accordance with the present invention. A host computer system 22 generates image data which is stored and displayed on a CRT display system 24 by a video controller 26. The video controller 26 includes several subsystems, including a video data memory and signal generator 28 for storing image data generating video signals for display on the CRT 24.

The video data memory and signal generator 28 is described in a patent application entitled High Resolution Graphics System, Ser. No. 656,262, which is assigned to the same assignee as the present invention and which is hereby incorporated in its entirety by reference.

The video controller 26 further includes a circuit 30 for generating the system clock, horizontal synchronization HSYN, vertical synchronization VSYN, and blanking BLANK signals used to synchronize the flow of image data from the video data memory 28 to the corresponding raster position on the CRT 24.

The video deflection signal generator 32 generates the horizontal drive H.DRV and vertical drive V.DRV signals which power the horizontal and vertical raster scan deflection coils 42 in the CRT 24. This signal generator 32 includes a vertical linearity correction circuit (not shown), which is discussed below with reference to FIG. 6.

Finally, the video controller 26 includes a video correction signal generator 34. The purpose of this subsystem 34 is to generate several correction signals which go to corresponding correction coils in the CRT 24. The amplitude of the correction signals is dynamically varied in accordance with the position of the CRT raster.

As will be discussed in greater detail below, the image generated by the CRT is organized as an array of tiles. A corresponding array of correction values is stored in the correction subsystem 34 for each correction parameter. A new set of correction values is read each time the CRT raster moves onto a new tile in the display. One set of correction values is used to control the voltage on the lens and drift tube (not shown in FIG. 1), thereby dynamically correcting the focus of the CRT 24. The other correction values are converted into analog current signals which drive the correction coils in the CRT 24.

The CRT 24 includes a screen 46, and a grid matrix 40 for generating eight electron beams from eight parallel streams of video data signals. Deflection coils 42 are driven by raster driver signals H.DRV and V.DRV, which are generated by the video deflection signal generator 32.

Correction coils 44 include both static correction coils similar to those used in prior art systems, and also dynamically driven coils which are driven by the video correction signal generator 34.

Figure 2A:
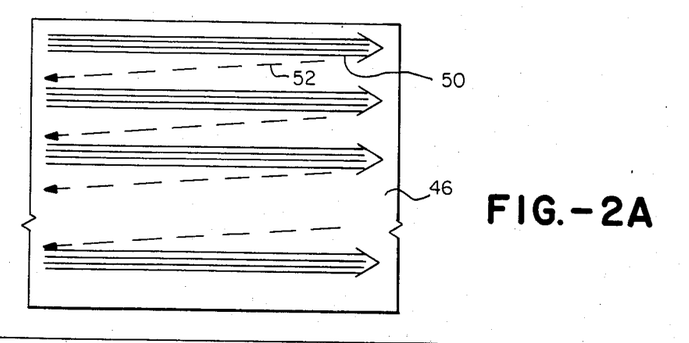
FIG. 2A schematically depicts a video display being written by several beams moving in parallel across a CRT screen.

Referring to FIG. 2A, the CRT 24 is a raster scan device that has eight beams for simultaneously writing image data on eight parallel scan lines. The eight electron beams sweep across the screen 46 in a band of parallel, adjacent scan lines (e.g., band 50) writing the picture as the beams move from the left side to the right side of the screen 46. During a period of time called horizontal blanking, the beams are turned off (or "blanked") and aimed at the left side of the screen (see dashed line 52) just below the band that was previously written. This process repeats until a complete image is generated, whereupon, during a period of time called vertical blanking, the beams are aimed at the upper left corner of the screen 46 and the image is written once again. In the preferred embodiment, the image is refreshed sixty times per second.

The resulting image comprises a multiplicity of parallel, nonoverlaping bands of pixels, each band of pixels comprising a set of parallel lines of pixels generated by a separate sweep of the band of parallel electron beams across the screen 46. (A pixel is the smallest unit of resolution of an image and corresponds roughly to one "point" on one scan line of a video display.)

Figure 2B:
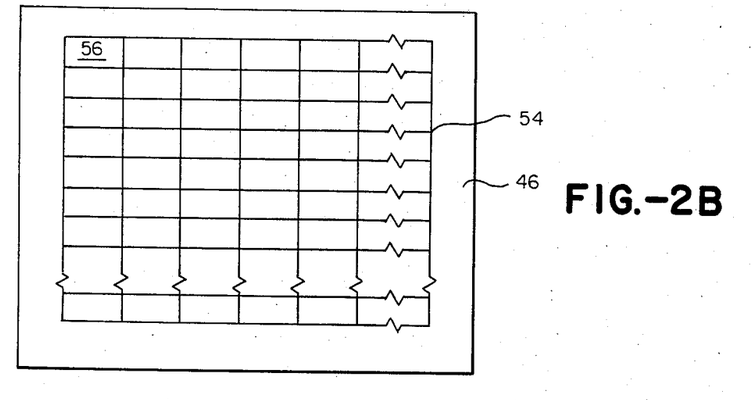
FIG. 2B schematically depicts the division of an image into an array of tiles.

Referring to FIG. 2B, the portion 54 of the screen 46 where images are displayed is organized as an array of tiles. Each tile 56 comprises an array of pixels of predetermined size.

In the preferred embodiment the CRT 24 generates an image of 2048 by 2048 pixels. For the purposes of tiling, each tile is eight scan lines (i.e., one band) deep and 128 pixels wide. Thus the image is organized as an array having 256 rows by 16 columns of tiles.

Figures 2C, 2D:
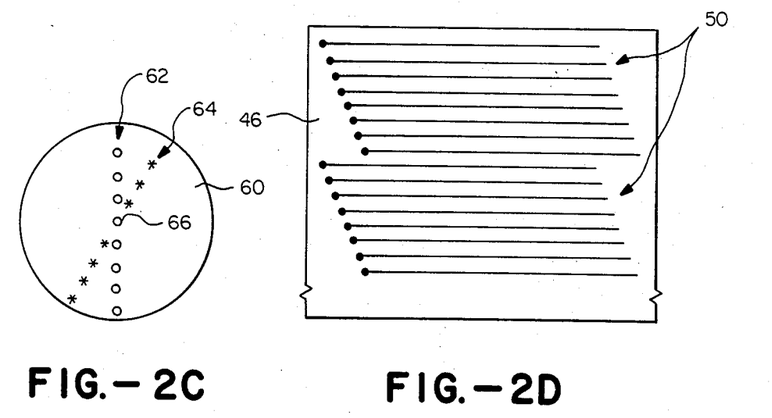
FIGS. 2C and 2D schematically depict the phenomenon of beam twisting in a multi-beam CRT.

Referring to FIGS. 2C and 2D, the inventors have found that multi-beam CRTs suffer from a problem they have named "twisting", which can noticeably affect the quality of the picture generated by such CRTs. Twisting is caused by tendency of electromagnetic fields in the CRT 24 to rotate the electron beams in the CRT about the axis of the CRT's neck as they travel towards the screen 46. These electromagnetic fields come from a variety of sources, including correction coils in the CRT for correcting the CRT's focus and other CRT imperfections. Visually, twisting causes pixels which should be vertically aligned to be horizontally displaced from one another.

Referring to FIG. 2C, line 62 represents a set of eight properly aligned parallel electron beams travelling down the neck 60 of the CRT 24. Line 64 represents a set of electron beams which have been twisted (i.e., rotated about the axis 66 of the CRT neck 60) by electromagnetic fields in the CRT 24.

Referring to FIG. 2D, the visual result of twisting is schematically depicted. As can be seen, the beams in each band 50 are not vertically aligned. While the slight misalignment in each band (of eight lines of pixels) is typically difficult to perceive, the disjointed transition from band to band is much more noticeable. In high resolution systems, the effect of twisting is noticeable as a warping or somewhat jagged undulating of the image.

As will be clear to those skilled in the art, twisting is a problem unique to multi-beam CRTs because in single beam CRTs rotation of the beam about the CRT's axis will not cause pixels which should be vertically aligned to be horizontally displaced from one another.

Figure 3:
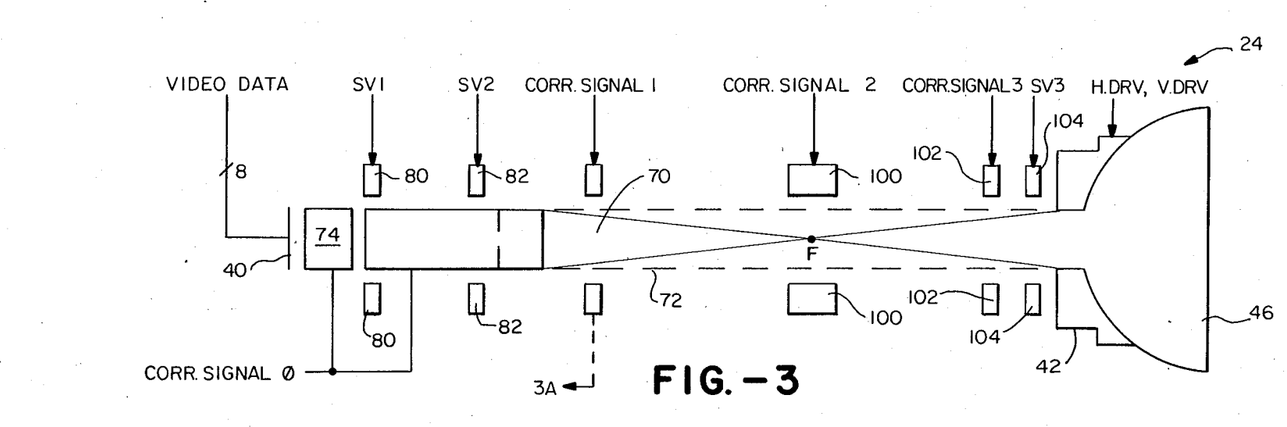
FIG. 3 schematically depicts a multi-beam CRT in accordance with the present invention.

Referring to FIG. 3, there is shown a schematic representation of a multi-beam CRT 24 in accordance with the present invention. Since the structure and theory of operation of cathode ray tubes is well known to those skilled in the art, only those aspects which are either new or are of particular relevance to the present invention are discussed herein.

The basic structure of the CRT 24 is that grid matrix 40 generates eight electron beams from eight parallel streams of video data signals. These electron beams accelerate down the neck 70 of the CRT toward the screen 46. As is standard in prior art CRTs, linear acceleration of the electrons is provided by a linearly varying electrostatic field which is generated by a helical resistive element 72 wrapped around the perimeter of the CRT neck 70. Deflection coils 42, which are driven by raster driver signals H.DRV and V.DRV, deflect the electron beams onto the screen 46 in a predefined raster scan pattern (as discussed above with reference to FIG. 2A).

Additional conventional elements of the CRT include an electrostatic lens 74 and a drift space tube 76 with an aperture 78 for capturing stray electrons. In one preferred embodiment of the invention the lens 74 is replaced by an extended drift space tube 76.

In the preferred embodiment, dynamic size correction is provided by dynamically varying the voltage of the lens 74 (if provided in the CRT 24) and the drift space tube 76. As will be explained in greater detail below, a distinct voltage level is provided as the CRT's electron beams are deflected by the raster deflection coils into each different tile 56 (see FIG. 2B) on the screen 46. This dynamic size correction voltage level is provided by Correction Signal 0.

The coils used to correct for gun and yoke imperfections and other picture quality aberrations are as follows.

Static detwist coils 80 and 82 are solenoid coils which are oriented to create oppositely oriented magnetic fields aligned with the axis of the cathode ray tube 24. The magnetic field generated by these solenoid coils twists the electron beams about the axis the CRT 24. It also partially collimates the electron beams.

The current level SV1 and SV2 of each coil 80 and 82 is independently determined during tube calibration, which is described below. These current levels, which in the preferred embodiment typically do not exceed 30 milliamps, are static. Therefore the field generated by the coils 80 and 82 does not vary over time.

The two static detwist coils 80 and 82 are separated by a predefined distance (typically one to one an a half inches) along the axis of the CRT 24. In the preferred embodiment these coils overlay the drift tube 76.

In alternate embodiments of the invention, the basic function of the static detwist coils could be accomplished using a single static detwist coil. Also, the detwist coil could be placed further toward the CRT screen 46, but generally before the crossover point F. However, since the current in the two detwist coils 80 and 82 are oriented in opposite directions, the preferred embodiment has the advantage that the amount of twisting caused by the detwist coils 80 and 82 corresponds to the difference in the current used in the two coils 80 and 82, whereas the amount of collimation caused by the coils corresponds to the sum of these currents.

Figure 3A:
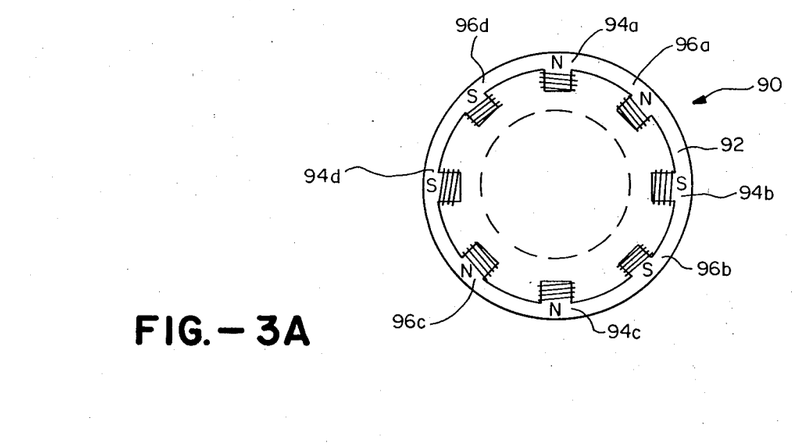
FIGS. 3A and 3B schematically depicts an astigmatism correction coil and a solenoid type correction coil.
Figure 3B:
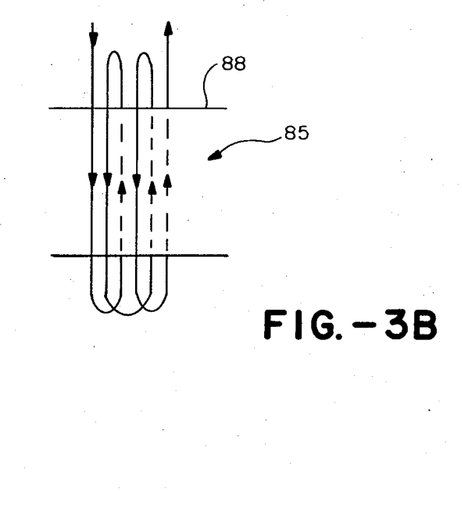

Referring temporarily to FIG. 3B, there is shown a schematic representation of a solenoid coil 85 which is wrapped around the outside 88 of the CRT neck 70. The use of solenoid coils for generating magnetic correction fields is necessary for the detwisting function (because of the required axial orientation of the magnetic field) and preferred for the other correction signals because the accuracy of magnetic field corrections are generally greater than corrections through the use of electrostatic fields to accomplish the same result.

Referring to FIGS. 3 and 3A, an astigmatism correction coil 90 is preferably located near the beginning of the helix coil 72. The electron beam velocity is relatively low at this location and the beam is relatively large in diameter, both factors which increase the sensitivity of the beams to astigmatism correction. This coil position also tends to decrease the amount of the size change caused by the astigmatism correction field.

As is known by those skilled in the art, astigmatism coils are used to correct for cylindrical aberrations in the CRT beam patterns. The inventors have found, however, that use of only a static astigmatism correction field is not satisfactory in high resolution display systems. The amount of astigmatism varies in accordance with the position of the screen 46 being written on by the CRT's electron beams. In particular, a static astigmatism correction field can correct for CRT gun aberrations, but only a dynamically changing astigmatism correction field can correct for deflection induced astigmatisms.

The astigmatism coil comprises a ferrite ring with two sets of windings 94a–d and 96a–d. The two sets of windings are oriented so as to produce fields which are 90 degrees out of phase with one another. One set of windings (e.g., windings 94a–d) have a static preselected current level. The other windings (e.g., 96a–d) have a current level which is controlled by Correction Signal 1. As will be explained in greater detail below, this current level is varied in accordance with the position on the screen 46 that the CRT beams are being deflected toward.

Dynamic detwist correction coil means 100 preferably comprises two solenoid coils substantially equidistant from the crossover point F. Crossover point F is a point along the axis of the CRT which the electron beams cross regardless of the screen position said beams are being deflected to. These two solenoid coils are oriented to create parallel magnetic fields aligned with the axis of the CRT 24.

Using the above described two solenoid coils in the dynamic detwist correction circuit cancels out any unwanted beam array size changes, at least to first order, which would otherwise result from the electromagnetic field generated by the detwist coils 100.

In the preferred embodiment the coils in the detwist means 100 are low inductance, high current solenoid coils which draw current levels of up to one ampere. This satisfies the high bandwidth requirement of the dynamic detwist correction signal.

The current level drawn by the coils in the detwist means is controlled by Correction Signal 2, which provides a distinct current level as the CRT's electron beams are deflected by the raster deflection coils into each different tile 56 (see FIG. 2B) on the screen 46.

Dynamic and static focus coils 102 and 104, respectively, are preferably located just before the deflection coils 42. These coils 102 and 104 are axial field solenoid coils similar to the above described static detwist solenoid coils 80 and 82, except that these coils are used to produce and correct the focus of the CRT 24. The static focus coil 104 is preferably a high inductance, low current, solenoid coil, while the dynamic focus coil 102 is a low inductance, high current, solenoid coil.

The current level drawn by the dynamic focus correction coil 102 is controlled by Correction Signal 3, which provides a distinct current level as the CRT's electron beams are deflected by the raster deflection coils into each different tile 56 (see FIG. 2B) on the screen 46.

The current level drawn by the static focus correction coil 104 is fixed when the CRT 24 is calibrated, as described below.

Figure 4:
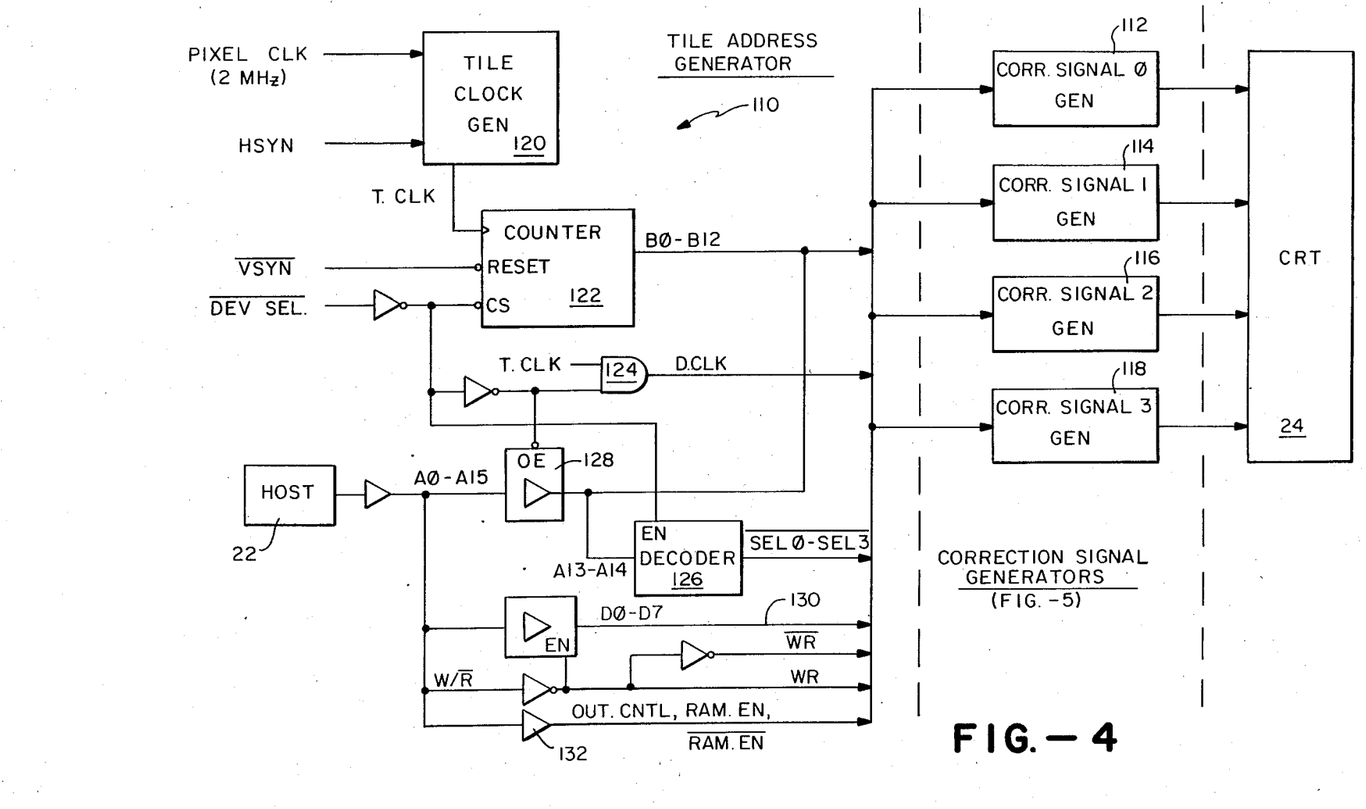
FIG. 4 is a block diagram of the video signal correction circuitry used in the preferred embodiment of the invention.

Referring to FIG. 4, there is shown a block diagram of the video signal correction circuitry used in the preferred embodiment of the invention.

A tile address generator circuit 110 generates the control and timing signals needed by the four dynamic Correction Signal Generators 112–118.

A tile clock generator 120 divides down the system's pixel clock or master clock (which runs at a rate of 2 MHz in the preferred embodiment) into a clock signal T.CLK which has an upward transition each time the CRT's beams are deflected into a new tile 56 (see FIG. 2A) on the screen 46. As will be understood by those skilled in the art, the tile clock generator 120 comprises a simple counter which acts as a clock divider and which is reset by the HSYN signal during horizontal blanking. By using the system's horizontal synchronization signal HSYN to reset the tile clock generator 120, the tile clock signal T.CLK is synchronized with the CRT's raster scan.

During normal operation, an address counter 122 increments the address signal labelled B0–B12 each T.CLK cycle. Thus a new address is generated each time the CRT's beams are deflected into a new tile 56 on the screen 46.

The address counter is reset during vertical blanking by the system's vertical synchronization signal $\overline{\text{VSYN}}$, so that the same address signal B0–B12 is generated for each tile 56 during every time an image is displayed.

In addition, the operation of the address counter 122 is enabled only when a device selection signal $\overline{\text{DevSel}}$ is disabled (i.e., at a high voltage). Similarly, the data clock signal D.CLK (which follows the tile clock signal T.CLK) is generated by AND gate 124 only when device selection signal $\overline{\text{DevSel}}$ is disabled.

Note that, unless otherwise indicated, noninverted logical signals (e.g., T.CLK) are enabled when at a high voltage and are disabled when at a low voltage; inverted logical signals (e.g., $\overline{\text{DevSel}}$) are enabled when at a low voltage and are disabled when at a high voltage.

When the system is being calibrated, the device selection signal $\overline{\text{DevSel}}$ is enabled (i.e., at a low voltage). During system calibration, data from the HOST computer 22 is stored in correction signal generators 112–118. As will be explained in greater detail below, during system calibration different sets of proposed Correction Signal values can be tested by temporarily storing those values in the correction signal generators 112–118.

Enabling $\overline{\text{DevSel}}$ causes buffer 128 to be enabled, which causes the HOST computer's address bus signal A0–A12 to be used as the tile address signal B0–B12. Further, address bus signals A13–A14 from the HOST computer 22 are decoded by a 2-to-4 decoder 126 into four selection signals $\overline{\text{Se10}}$–$\overline{\text{Se13}}$. However, if DevSel is disabled, all four selection signals $\overline{\text{Se10}}$–$\overline{\text{Se13}}$ are disabled (i.e., kept at a high voltage).

If the W/$\overline{\text{R}}$ signal from the HOST computer is at a low voltage, the writing of data signals D0–D7 from the HOST 22 onto internal data bus 130 is enabled.

Finally, control signals OUT.CNTL, RAM.EN and $\overline{\text{RAM.EN}}$ from the HOST computer 22 are received by the system through buffer 132. The use of these signals is explained below with reference to FIG. 5.

Figure 5:
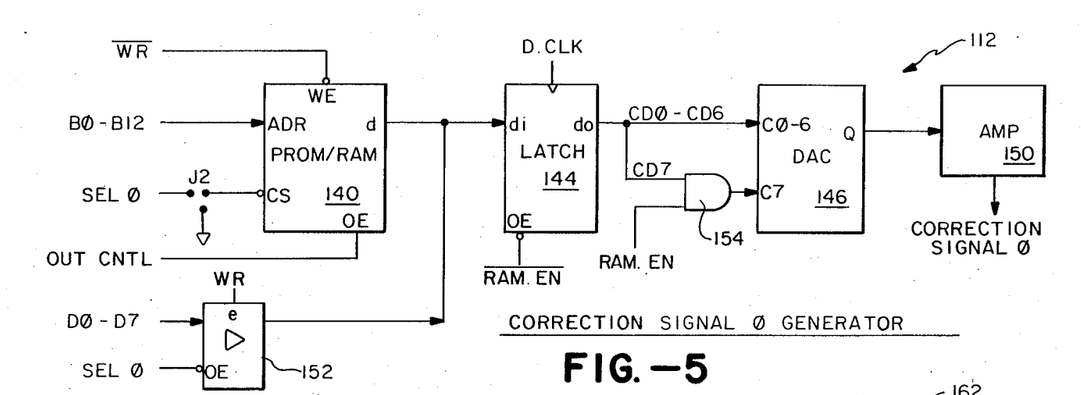
FIG. 5 is a block diagram of a single digital correction signal generator.

Referring to FIG. 5, since the signal generators for the four dynamic Correction Signals 0–3 are virtually identical (except for the differences noted below) the design and operation of all four is explained herein with reference to a block diagram of a single digital correction signal generator 112.

During normal system operation, memory 140 is a 4k×8 PROM (programmable read only memory) which holds a preselected array of correction values for Correction Signal 0. During system calibration, however, the memory 140 is a 4k×8 RAM (random access memory) which holds an array of correction values written into the memory by the HOST computer 22. In other words, a RAM is used during system calibration, and then a pin compatible PROM which holds the calibration values is put in its place.

During normal system operation jumper J1 couples the memory's chip select port CS to the circuit ground, thereby permanently enabling the memory 140. Also, the $\overline{\text{Se10}}$ signal is disabled and the RAM.EN, $\overline{\text{RAM.EN}}$, and OUT.CNTL signals are enabled.

In this mode, the eight-bit datum D0–D7 in the memory location addressed by address signal B0–B12 is read onto line 142 and then latched into latch 144 by an upward transition of the D.CLK signal. The datum is then converted by digital to analog converter (DAC) 146 into an analog signal on line 148 having a magnitude corresponding to the binary value of the datum D0–D7. Finally, the analog signal on line 148 is amplified by amplifier 150 into an appropriately scaled signal.

During system calibration, the jumper J1 couples the memory's chip select port CS to the selection signal $\overline{\text{Se10}}$, thereby allowing the HOST to control which correction signal generator 112–118 is currently being programmed. Also, the memory 140 used is a 4k×8 RAM.

Before data is loaded from the HOST 22 into the memory 140, WR is enabled (i.e., held high), and $\overline{\text{Se10}}$ is enabled (i.e., held low), thereby enabling buffer 152 which transfers data from internal data bus 130 to line 142. $\overline{\text{WR}}$ is enabled (i.e., held low), enabling the storage of the data on line 142 into the memory location designated by the current value of address signal B0–B12.

While the memory 140 is being loaded with data, it is important to protect the amplifier 150 from sharp changes in the input signal on line 148 because such signal variations could cause the amplifier 150 to burn out. To accomplish this protection, the RAM.EN, and $\overline{\text{RAM.EN}}$ signals are disabled. Disabling $\overline{\text{RAM.EN}}$ causes the outputs CD0–CD7 of the latch 144 to be tristated (i.e., put into a high impedance state); disabling RAM.EN disables transfer gate 154, which causes the most significant bit of the data being converted by DAC 146 to be be a zero bit. The disabling of gate 154 ensures that the DAC 146 will receive input signals no larger than one half the maximum amplitude otherwise possible, and therefore will generate a similarly circumscribed set of output signals.

In the preferred embodiment, the DAC 146 treats the tristated input data signals CD0–CD6 as one bits and therefore the DAC 146 sees an input signal of $7F_H$ (i.e., a decimal value of 127). Also, the DAC 146 is set up so as to generate an output signal proportional to the difference between the input signal value and $7F_H$. Therefore, the disabling of the RAM.EN and $\overline{\text{RAM.EN}}$ signals causes the DAC 46 to output a null output signal—which is a desirable way of suppressing operation of the correction coils while data is being loaded into the memory 140.

When the data in the memory is to be tested during a display cycle, WR and $\overline{WR}$ are disabled, and $\overline{Se10}$, OUT.CNTL, RAM.EN and $\overline{RAM.EN}$ are enabled. In this mode, the memory 140 works in the same way as described above when a PROM is used.

Once an appropriate set of values have been found for use in the Correction Signal Generator, these values are stored in a PROM which is then used in place of the RAM as the memory 140.

In the preferred embodiment, Correction Signal 0 is a voltage signal (having a maximum amplitude of 30 volts), while the other Correction Signals 1-3 are current signals. While the scaling and the voltage/current nature of the correction signals varies from signal to signal, the only differences between the four generators 112-118 are: (1) in the particular amplifier 150 used to scale the analog output signal; and (2) in the selection signal $\overline{Se1X}$ used during calibration.

Referring to FIGS. 2A and 2D, imperfections in the CRT 24 and in the video deflection signal generator 32 (see FIG. 1) can cause the distance between the bottom scan line of one band and the top scan line of the next band to (1) be different at different positions on the screen, and (2) to be different from the distance between the scan lines within each band. These differences are observable as either band gaps or band overlaps.

While the distance between scan lines within each band is fixed, the distance between the bottom scan line of one band and the top scan line of the next band is controllable in the system of the present invention.

Figure 6:
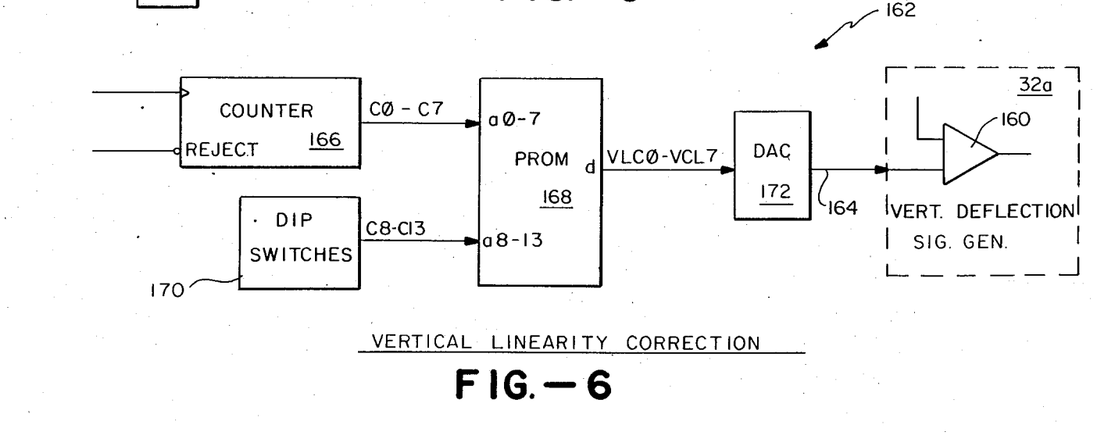
FIG. 6 is a block diagram of the vertical linearity correction circuit used in the preferred embodiment of the present invention.

Referring to FIG. 6, the vertical deflection signal generator 32a in the video deflection signal generator 32 (see FIG. 1) of the preferred embodiment includes a standard integrator circuit 160. The output of this integrator circuit controls the vertical position that the CRT's electron beams are deflected to.

One aspect of the present invention is the provision of a vertical linearity correction circuit 162, shown in FIG. 6 in block diagram form, which varies the reference voltage used by the vertical position integrator circuit 160. The sign and magnitude of the vertical linearity correction signal (on line 164) control the direction and extent to which the system's normal vertical band separation is modified.

The vertical linearity correction circuit 162 includes an address counter 166 which increments each time the CRT finishes the writing of one band of pixels and moves on to the next band. The counter 166 is clocked by the horizontal synchronization signal HSYN and is reset by the vertical synchronization signal $\overline{VSYN}$. Since, in the preferred embodiment the image on the screen 46 is generated using 256 bands of pixels, an eight bit counter 166 is sufficient. The address signal generated by the counter 166 is labelled C0-C7.

In the preferred embodiment, an 8k×8 PROM 168 is used to store 64 different sets of vertical linearity correction values. By providing one PROM with different sets of correction values the inventors have found that it is possible to avoid custom programming a different PROM for the vertical linearity correction circuit 162 of each different CRT 24. The 64 different sets cover a wide enough range of correction patterns that a suitable set can be found for virtually all CRTs. One of these sets is selected during system calibrating by setting DIP switches 170 so that the address signal labelled C8-C13 addresses the selected set of 256 correction values.

The 8-bit output of the PROM, labelled VLC0-VLC7 is converted by a digital to analog converter DAC 172 into the analog vertical linearity correction signal on line 164 which controls the direction and extent to which the system's normal vertical band separation is modified.

Calibration of the various correction circuits provided by the invention is easier than it might first appear because most of the correction values can be derived by selecting proper values for a relatively small number of tiles and then using standard curve fitting techniques to fill in the values for the remaining tiles.

In terms of order, the vertical linearity and static correction coils are generally adjusted first. The vertical linearity correction circuit 162 is generally used to compensate for the fact that bands towards the top and bottom of the screen tend to either grow increasingly too far away from one another or increasingly too close. The 64 sets of prestored vertical linearity correction values in PROM 168 cover a wide range of these band gap patterns. The one which best compensates for the observed band gaps is selected using DIP switches 170.

The static correction coils are adjusted before the dynamic correction coils so that the dynamic correction coils are used only to make relatively fine adjustments in picture quality.

Each dynamic correction circuit 112-118 is adjusted separately. The inventors have found that it is generally sufficient to provide the HOST computer 22 with correction values for only a dozen or so tiles and then to have the computer 22 generate the remaining values using standard curve fitting techniques. The curve fitting technique for each correction factor can be adjusted to fit the most typical pattern of correction factors needed. These patterns will depend on the design of the CRT and will therefore tend to vary somewhat from one CRT design to another.

Because the different correction signals tend to interact and interfere with one another's operation, the calibration process requires at least a certain amount of reiteration. In terms of order, the preferred order of calibrating the dynamic correction factors is as follows.

First a preselected set of dynamic focus values, which are known from past experience to be reasonable, are loaded into the memory of correction circuit 112. Then, using a small number of test sites (e.g., six tiles: the centers of the four sides of the image, the center, and one corner) dynamic focus, astigmatism, and detwist correction values are calculated using a simple linear interpolation technique and loaded into the memory of the corresponding correction signal generators. By "using test sites," what is meant is the trial and error adjusting of correction values for selected tiles until the observed image in the selected tile has been satisfactorily corrected. Then the corrections for the other values are derived using by interpolating from the values used in the test sites. After this first pass at deriving correction factors, the system is ready for the second phase of the calibration process.

The next step is to adjust the vertical linearity correction values so that all gaps between bands are eliminated. This step, too, can generally be accomplished by manually adjusting the correction factors for a few (e.g., 5 sites) and then mathematically deriving the remaining values.

Then dynamic size correction values are derived, preferably using a somewhat greater number of test sites (e.g., twenty-five) than used for the initial setup. Then the other dynamic correction signal values (astigmatism, focus, and detwist) are revised, also using a somewhat greater number of test sites (e.g., twenty-five) than used for the initial setup.

Finally, the map of values for each of the correction signals is smoothed using a stepwise multiple regression method, and then the dynamic focus is manually touched up (i.e., by individually adjusting up or down the correction values for particular tiles) to the extent necessary to produce a well focused image. The other correction signals values can also be touched up if the result of the smoothing operation is unsatisfactory. The final values for each correction signal are stored in an EPROM which is then installed in the CRT controller for the CRT which has just been calibrated.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, as will be appreciated by one skilled in the art, the number of beams and the number of horizontal bands on the screen are of no consequence any may be changed without detracting from the substance of the invention. Similarly, the invention is also independent of the specific structure of the multi-beam gun and is independent of whether the CRT 46 works in a direct view or projection mode. Further, the invention could be used with an interlaced CRT rather than the noninterlaced type of CRT used in the preferred embodiment.

What is claimed is:

1. A picture quality control system for use with a multi-beam raster scan display device having:
   a cathode ray tube with multi-beam gun means for simultaneously generating a band of parallel electron beams, a screen, responsive to electrons impinging thereon, for displaying an image generated by said electron beams, and a neck coupling said gun means to said screen, said neck having a center axis and an acceleration region in which said beams are accelerated toward said screen; and
   raster deflection means at the end of said neck for periodically deflecting said electron beams onto said screen in a predefined raster scan pattern;
   said image comprising a multiplicity of parallel bands of pixels, each said band of pixels comprising a set of parallel lines of pixels generated by a separate sweep of said band of parallel electron beams across said screen;
said control system comprising:
   linearity correction means, coupled to said raster deflection means, for adjusting the distance between neighboring ones of said bands of pixels in accordance with the position on said screen that said electron beams are being deflected to by said raster deflection means; and
   dynamic detwist means for adjusting the relative positions of said electron beams within said band of electron beams, including
      dynamic detwist coil means for generating an electromagnetic field, in a predefined portion of said neck of said cathode ray tube, which causes said band of beams to rotate with respect to the center axis of said neck; and
      detwist correction signal generation means for controlling the magnitude of the electromagnetic field generated by said detwist coil means in accordance with the position on said screen that said electron beams are being deflected to by said raster deflection means.

2. The control system of claim 1, further including:
static detwist means for adjusting the relative positions of said electron beams in said band of electron beams, including
   static detwist coil means, separate from said dynamic detwist coil means, for generating a static electromagnetic field of fixed magnitude in a predefined portion of said neck of said cathode ray tube, which causes said band of beams to rotate with respect to the center axis of said neck by an angular amount proportional to said fixed magnitude.

3. The control system of claim 2, wherein
said static detwist coil means includes two solenoid coils, separated by a predefined distance along the axis of said cathode ray tube, said solenoid coils being oriented to create oppositely oriented magnetic fields aligned with the axis of said cathode ray tube.

4. The control system of claim 1, wherein
there is a crossover point along the axis of said cathode ray tube which said electron beams cross regardless of the screen position said beams are being deflect to; and
said dynamic detwist coil means includes two solenoid coils substantially equidistant from said crossover point, said solenoid coils being oriented to create parallel magnetic fields aligned with the axis of said cathode ray tube.

5. The control system of claim 1, further including:
dynamic astigmatism correction means and dynamic focus correction means for correcting astigmatism and focus imperfections in the image generated by said electron beams, including
   dynamic astigmatism coil means and dynamic focus field generation means for generating electromagnetic fields in predefined portions of said cathode ray tube; and
   dynamic astigmatism correction signal generation means and dynamic focus correction signal generation means for controlling the magnitude of the electromagnetic fields generated by said dynamic astigmatism coil means and said dynamic focus field generation means, respectively, in accordance with the position on said screen that said electron beams are being deflected to by said raster deflection means.

6. The control system of claim 1, wherein
said linearity correction means includes digital memory means for storing a linearity correction value for each said band of pixels in said image, each said linearity correction value corresponding to the distance said band is to be moved by said linearity correction means with respect to said band's display position on said screen.

7. The control system of claim 6, wherein
the portion of said screen where images are displayed is organized as an array of tiles, each tile comprising a predefined number of contiguous pixels in each of a predefined number of contiguous lines of pixels; and
said dynamic detwist correction means includes digital memory means for storing a detwist correction value for each said tile, each said detwist correction value corresponding to the magnitude of the electromagnetic field to be generated by said detwist coil means when said electron beams are being deflected by said raster deflection means into said tile.

8. The control system of claim 7, further including:
dynamic astigmatism correction means and dynamic focus correction means for correcting astigmatism and focus imperfections in the image generated by said electron beams, including
dynamic astigmatism coil means and dynamic focus field generation means for generating electromagnetic fields in predefined portions of said cathode ray tube; and
dynamic astigmatism correction signal generation means and dynamic focus correction signal generation means for controlling the magnitude of the electromagnetic fields generated by said dynamic astigmatism coil means and said dynamic focus field generation means, respectively;
said dynamic astigmatism correction signal generation means and said dynamic focus correction signal generation means each including digital memory means for storing a value for each said tile, each said value corresponding to the magnitude of the electromagnetic field to be generated by the corresponding dynamic astigmatism coil means and dynamic focus field generation means when said electron beams are being deflected by said raster deflection means into said tile.

9. The control system of claim 1, wherein
said cathode ray tube includes a drift space tube in the portion of said neck nearest said gun means; and
said control system further includes
dynamic size correction means for dynamically adjusting the size of the pixels generated by said electron beams, including means for imposing a voltage on said drift space tube in accordance with the position on said screen that said electron beams are being deflected to by said raster deflection means.

10. In a method of adjusting the quality of a picture generated by a multi-beam raster scan display device having:
a cathode ray tube with multi-beam gun means for simultaneously generating a band of parallel electron beams, a screen, responsive to electrons impinging thereon, for displaying an image generated by said electron beams, and a neck coupling said gun means to said screen, said neck having a center axis and an acceleration region in which said beams are accelerated toward said screen; and
raster deflection means for periodically deflecting said electron beams onto said screen in a predefined raster scan pattern;
said image comprising a multiplicity of parallel bands of pixels, each said band of pixels comprising a set of parallel lines of pixels generated by a separate sweep of said band of parallel electron beams across said screen;
the steps comprising:
generating a linearity correction signal, for use by said raster deflection means, for adjusting the distance between neighboring ones of said bands of pixels in accordance with the position on said screen that said electron beams are being deflected to by said raster deflection means; and
detwisting said simultaneously generated electron beams by adjusting the relative positions of said electron beams within said band of electron beams, including the steps of
providing dynamic detwist coil means for generating an electromagnetic field in a predefined portion of said neck of said cathode ray tube, which causes said band of beams to rotate with respect to the center axis of said neck; and
controlling the magnitude of the electromagnetic field generated by said detwist coil means in accordance with the position on said screen that said electron beams are being deflected to by said raster deflection means.

11. The method of claim 10, wherein
there is a crossover point along the axis of said cathode ray tube which said electron beams cross regardless of the screen position said beams are being deflect to; and
said dynamic detwist coil means includes two solenoid coils substantially equidistant from said crossover point, said solenoid coils being oriented to create parallel magnetic fields aligned with the axis of said cathode ray tube.

12. The method of claim 10, further including the steps of:
dynamically correcting astigmatism and focus imperfections in the image generated by said cathode ray tube, including the steps of
providing dynamic astigmatism coil means and dynamic focus field generation means for generating electromagnetic fields in predefined portions of said cathode ray tube; and
controlling the magnitude of the electromagnetic fields generated by said dynamic astigmatism coil means and said dynamic focus field generation means, respectively, in accordance with the position on said screen that said electron beams are being deflected to by said raster deflection means.

13. The method of claim 12, wherein
said cathode ray tube includes an electrostatic lens and drift space tube; and
said method further includes the steps of
dynamically adjusting the size of the pixels generated by said electron beams by imposing a voltage on said lens and drift space tube in accordance with the position on said screen that said electron beams are being deflected to by said raster deflection means.

14. The method of claim 10, wherein
said step of generating a linearity correction signal includes storing a linearity correction value for each said band of pixels in said image, each said linearity correction value corresponding to the distance said band is to be moved by said linearity correction means with respect to said band's display position on said screen.

15. The method of claim 14, wherein
the portion of said screen where images are displayed is organized as an array of tiles, each tile comprising a predefined number of contiguous pixels in each of a predefined number of contiguous lines of pixels; and
said detwist step includes storing a detwist correction value for each said tile, each said detwist correction value corresponding to the magnitude of the electromagnetic field to be generated by said detwist coil means when said electron beams are being deflected by said raster deflection means into said tile.

16. The method of claim 15, further including the steps of:

dynamically correcting astigmatism and focus imperfections in the image generated by said cathode ray tube, including the steps of providing dynamic astigmatism coil means and dynamic focus field generation means for generating electromagnetic fields in predefined portions of said cathode ray tube; and controlling the magnitude of the electromagnetic fields generated by said dynamic astigmatism coil means and said dynamic focus field generation means, respectively, in accordance with the position on said screen that said electron beams are being deflected to by said raster deflection means, including the step of storing an astigmatism correction value and a focus correction value for each said tile, each said astigmatism correction value and focus correction value corresponding to the magnitude of the electromagnetic field to be generated by the corresponding dynamic astigmatism coil means and dynamic focus field generation means when said electron beams are being deflected by said raster deflection means into said tile.

17. The method of claim 10, wherein said cathode ray tube includes a drift space tube in the portion of said neck near said gun means; and said method further includes the step of dynamically adjusting the size of the pixels generated by said electron beams by imposing a voltage on said drift space tube in accordance with the position on said screen that said electron beams are being deflected to by said raster deflection means.

* * * * *